March 5, 1968  R. H. FINK ET AL  3,371,421
CONTAINER RIM DIP INSPECTION APPARATUS
Filed Aug. 16, 1966  3 Sheets-Sheet 1

INVENTOR
ROGER H. FINK
FREDERICK Z. FOUSE
BY Norman D. Holland
ATTORNEY

March 5, 1968  R. H. FINK ET AL  3,371,421

CONTAINER RIM DIP INSPECTION APPARATUS

Filed Aug. 16, 1966  3 Sheets-Sheet 2

INVENTOR
ROGER H. FINK
FREDERICK Z. FOUSE
BY
Norman M Holland
ATTORNEY

March 5, 1968   R. H. FINK ET AL   3,371,421
CONTAINER RIM DIP INSPECTION APPARATUS
Filed Aug. 16, 1966   3 Sheets-Sheet 3

INVENTOR
ROGER H. FINK
BY FREDERICK Z. FOUSE

Norman D Holland
ATTORNEY

United States Patent Office 3,371,421
Patented Mar. 5, 1968

3,371,421
CONTAINER RIM DIP INSPECTION APPARATUS
Roger H. Fink and Frederick Z. Fouse, Lancaster, Ohio, assignors to Anchor Hocking Glass Corporation, Lancaster, Ohio, a corporation of Delaware
Filed Aug 16, 1966, Ser. No. 572,717
16 Claims. (Cl. 33—174)

This invention relates to a sensing apparatus for detecting uneven sealing edges of rims and particularly for detecting slight dips or waves in the sealing edge of the rim of glass containers that would result in an imperfect seal.

Glass containers are sealed by a resilient plastic or rubber gasket mounted in a closure cap and engaging the top surface of the rim of the container. These rims should be free of faults and have even or nearly even surface. However, in the manufacture of glass containers unevenness of the sealing edge may occur which may result in improper sealing.

This unevenness is relatively slight and difficult to detect by visual inspection. Not all unevenness is objectionable. Minor dips or waves may be compensated for by the gasket and proper seals produced. In the inspection method differentiation between acceptable and unacceptable dips or waves is desirable in order to avoid the unnecessary and expensive rejection of sealable glass containers.

In the Patent 3,206,026 issued on Sept. 14, 1965 to Frederick Z. Fouse and William H. Fouse a satisfactory machine and method is described for inspecting the sealing edge of the rim of a glass container to detect variations resulting in an imperfect seal and to differentiate from variations in the sealing edge that would not result in an imperfect seal. However, this machine requires the relative rotation of the containers and sensing means so that the sensing means will travel over the entire rim. This relative rotation makes the machine and operations more complex and in the embodiment described requires the rotation of the glass containers.

It is, therefore, desirable to provide a sensing apparatus for engaging the sealing edge of the rim of a glass container which does not require the glass container to be rotated during the inspection operation and can differentiate between acceptable and unacceptable variations in the sealing edge of the rim.

An object of the invention is to provide a sensing apparatus for inspecting the rims of glass containers without requiring the relative rotation of the container and sensing means.

Another object of the invention is to provide a sensing apparatus for inspecting the rims of glass containers by engaging the entire rim at the same time.

Another object of the invention is to provide a rim inspection apparatus for examining containers having a variety of sizes and shapes.

Another object of the invention is to provide a sensing apparatus that can differentiate between acceptable and rejectable deviations in the surface of the rim of the container without relative rotation of the container and sensing means.

Another object of the invention is to provide a rim sensing apparatus that may operate at high speeds with high reliability by engaging the entire rim at the same time.

Other and further objects of the invention will be obvious upon an understanding of the illustrative embodiments about to be described, or will be indicated in the appended claims, and various advantages not referred to herein will occur to one skilled in the art upon employment of the invention in practice.

Embodiments of the invention have been chosen for purposes of illustration and description and are shown in the accompanying drawings forming a part of the specification, wherein FIG. 1 is a side view of the sensing apparatus with a half section through the main axis;

Figures 8A, 8B, 8C, 8D, 8E:
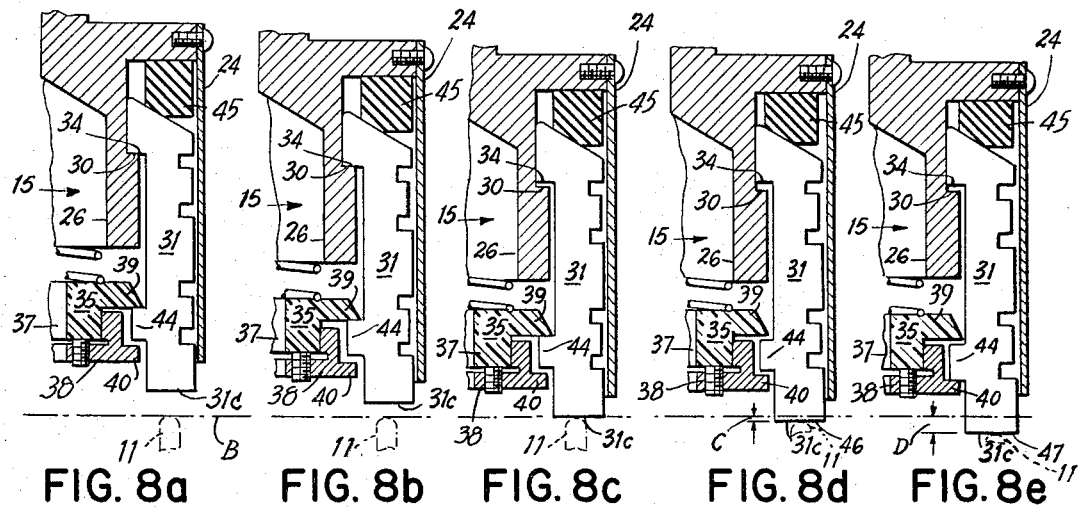
Figure 9:
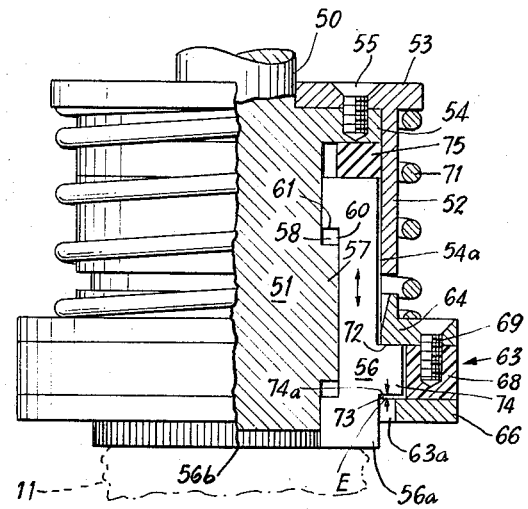

FIGS. 8a–e illustrate the downward movement of the sensing apparatus and the various positions of the sensing elements; and FIG. 9 is a side view of another embodiment of the sensing apparatus with a half section through the main axis.

Figure 1:
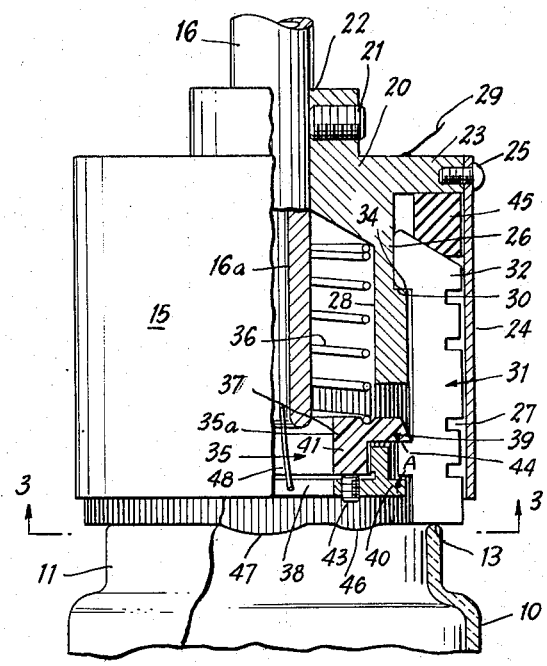
Figure 2:
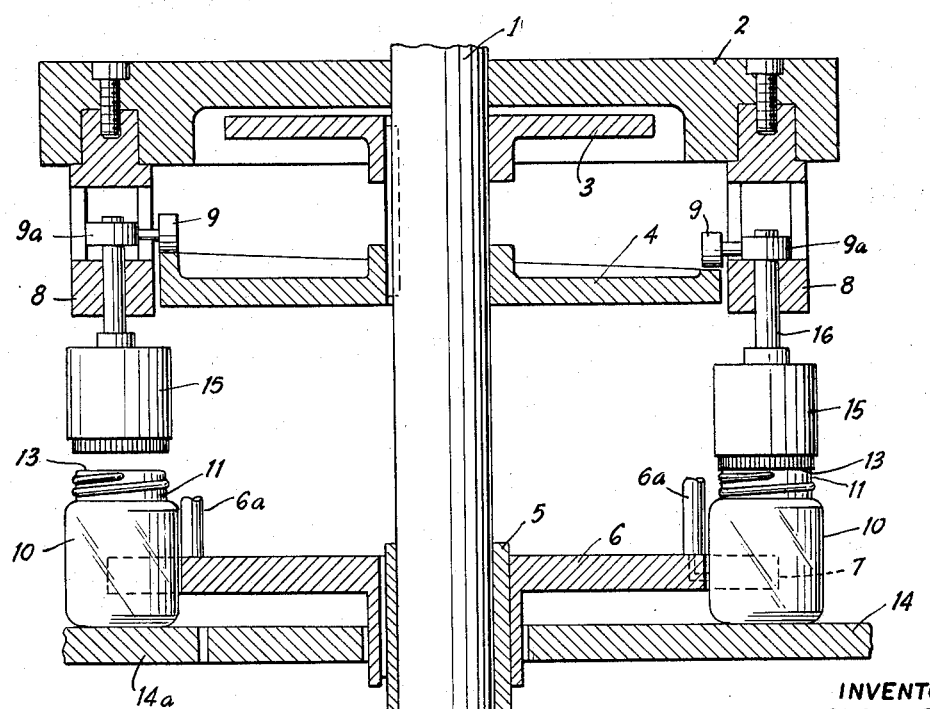
FIG. 2 is a fragmentary sectional view of a rim inspecting machine having a sensing apparatus taken through a sensing position and rejecting position.

In FIG. 2 an inspection machine described in the Patent No. 3,206,026 is fragmentarily illustrated and has been modified to reciprocally support the dip detector 15 illustrated in FIG. 1 and operates in a similar manner except for adaptation to the present invention. The machine comprises a turret mounting post 1 supporting the head 2 and the cams 3 and 4. A vertically rotating drive sleeve 5 is positioned concentric to the post 1 and rotatably supports the star wheel 6 having pockets 7 for moving the glass containers 10 on the table 14. A dip detector 15 is reciprocally supported by shaft 16 in a mounting 8 secured to the head 2. A cam roller 9 secured to the shaft 16 by the collar 9a engages cam 4. Containers are held on the star wheel by vacuum means 6a operated by cam 3. Unacceptable containers are rejected by separate release of the vacuum when the containers 10 are on the defective container take-off wheel 14a overlapping the table 14. The cam 4 raises and lowers the dip detector 15 to engage the rim 11 of the container 10 to sense the evenness of the sealing edge 13.

As best illustrated in FIG. 1 the detector 15 comprises a supporting member 20 securely fastened to the shaft 16 by the set screw 21 and axially held by the shoulder 22 on the shaft 16. The supporting member 20 has a flange 23 extending radially circumferentially around the upper end of the detector and a cylindrical member 26 extending coaxially from the inner portion of the flange. A sleevelike member 24 of sheet metal is fastened to the outer edge of the flange 23 by the screws 25 and extends downwardly concentric to the cylindrical member to form an annular chamber 27 therebetween. The cylindrical member 26 has an upwardly facing shoulder 30 intermediately positioned thereon. A large number of thin sensing elements 31 are circumferentially stacked between the cylindrical member 26 and the sleevelike member 24. In this particular embodiment two hundred elements are provided.

The elements 31 (FIGS. 1 and 6) are identical and have a head portion 32 with an upper sloped surface 33 and a downwardly facing shoulder 34 mating with the shoulder 30 for retaining the elements in the detector. The elements 31 extend longitudinally beyond the cylindrical member 26 and have tabs 44 interfitting with the reference member 35.

The reference member 35 (FIGS. 1 and 4) is suspended within the sleeve 24 by a helical spring 36 attached to the supporting member 20 and moves axially and tilts in a universal action about the main axis of the detector. The member 35 comprises an upper insulating portion 37 and a lower electrically conductive portion 38. These portions 37 and 38 have continuous radial rims 39 and 40, respectively, spaced axially a distance A. The conductive portion 38 has an annular flange 41 interfitting with the insulating portion 37 for radially positioning the conductive portion 38 in relation to the insulating portion 37. Screws 42 fasten the conductive portion 38 to the insulating portion 37 and set screws 43 adjust the relationship of the two portions and the distance A between the rims 39 and 40.

The distance A between the rims 39 and 40 and the axial length of the tab 44 determine the tolerance or movement permitted of the sensing element 31 in passing acceptable deviations in the sealing edge 13. The set screws 43 threaded in the conductive portion 38 can be used to vary this tolerance depending upon the containers being inspected.

Figure 3:
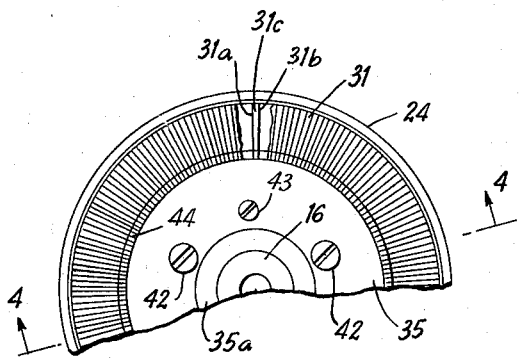
FIG. 3 is a view of the rim engaging end of the inspection apparatus.

The elements 31, as illustrated in FIGS. 1, 3, 4, 5, and 6, are wedge-shaped and have flat side surfaces 31a, 31b which extend radially when the elements are mounted in the circumferentially stacked array, as illustrated in FIG. 3.

The side surfaces of the elements 31 are in slideable contact so that one element may be readily moved in relation to the adjacent elements on each side. Thus a respective element will move in response to axial or longitudinal forces applied thereto. The lower edge surface 31c is flat and extends normal to the main axis of the dip detector. The surface has sufficient radial length for engaging a variety of jars having rims of different diameters. The elements 31 are stacked completely around the detector and are held in the stacked relation by the intimate packing of the elements, by the cylindrical member 26 and the sleevelike member 24. The shoulders 34 on the elements 31 catch on the shoulder 30 of the cylindrical member 26 to position the rim engaging or lower edge surfaces 31c in a single plane and to hold the elements in the detector. The tabs 44 are all aligned and the insulated rim rests on the upper surfaces of the tabs.

Figure 7:
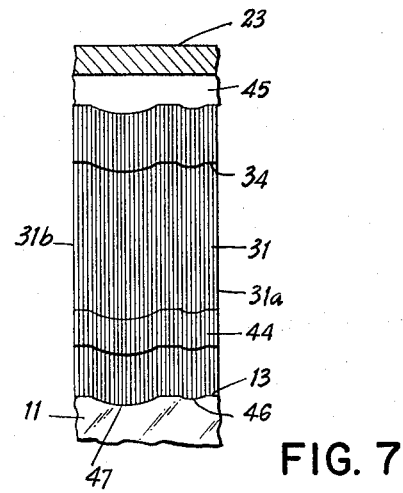
FIG. 7 is a fragmentary panoramic view of the inner edges of the sensing elements.

As the elements engage the sealing surface 13 the downward movement of the elements engaging the even portions of the rim ceases. As illustrated in FIGS. 1, 7 and 8, the elements over a dip move further downward than the elements engaging the even portion of the sealing edge of the jar. The tabs 44 of elements mating with dips correspondingly move down to indicate the departure of the sealing edge from the even condition (FIG. 7).

Figure 4:
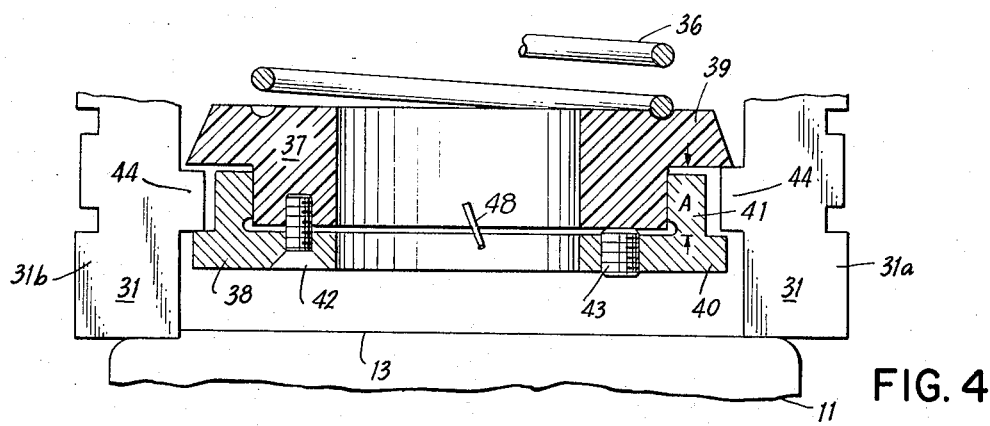
FIG. 4 is an enlarged sectional view of the sensing apparatus taken along lines 4—4 of FIG. 3 illustrating the inspection of a rim with an unacceptable dip.

In FIG. 4 the element 31 on the right side is engaging an even portion of the sealing edge and is, therefore, spaced from rim 40. The element on the opposite side is mating with a dip portion of the sealing edge. This dip is sufficient to cause the tab 44 to engage the lower rim 40 of the conductive portion of the reference member 35.

Figure 6:
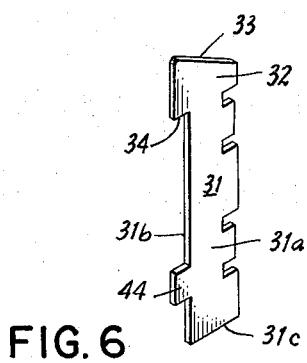
FIG. 6 is a perspective view of a sensing element.

The sensing elements 31 registering with the dip are moved downward by the elastic gasket 45 positioned between the flange 23 and the sloped upper surface 33 of the head portion 32 (FIGS. 1 and 6). The sensing elements 31 are made of metal, and the cylindrical member 26 and supporting member 20 are also made of metal and form a conductive path.

A lead 48 (FIGS. 1 and 4) is connected to the electrically conductive portion 38 and extends up through the hole 35a in the reference member 35 and the bore 16a (FIG. 3) in the shaft 16, and the lead 49 is connected to the supporting member 20 or flange 23. The leads may be connected to an electrical apparatus, as described in the Patent No. 3,206,026, for actuating the rejection mechanism.

The spring 36 fits in the chamber or recess 28 defined by the cylindrical member 26 and is attached at the upper end thereof. This spring permits the reference member to move free axially. It also permits the reference member to tilt universally about the main axis of the detector.

The movement of the detector is fragmentarily shown in FIGS. 8a–e. In FIG. 8a the detector 15 is in the raised position above the plane B of the sealing edge of the glass containers being tested. The elements 31 are held in position by the shoulders 34 of the elements 31 resting on the annular shoulder 30 of the cylindrical member 26. The edges 31c of the elements are all in the same plane. The rim 39 of the insulating portion 37 rests on the tabs 44. As the detector moves downward, as shown in FIG. 8b, this relationship is maintained. On engagement by one or more of the sensing elements 31 with the sealing edge of the rim, the shoulders 30 and 34 separate since the cylindrical member 26 continues to move downward. The downward movement of the reference member 35 is also arrested except for the instance shown in FIG. 5. Thus the engaging elements 31 hold the reference member 35 in a reference position against which the unengaged portions of the sealing edge are measured. As previously explained the non-engaging elements are forced downward into engagement by the resilient gasket 45.

In FIG. 8d a sensing element 31 rests on the sealing edge at a dip having a depth C, as illustrated at 46 in FIGS. 1 and 7. This is within the permissible departure, since the lower edge of the tab 44 is spaced above the rim 40 of the conducting portion.

On further movement of the detector, as illustrated in FIG. 8e, the element 31 engages the sealing edge having a dip of a depth D. This is illustrated at 47 in FIGS. 1 and 7. The lower edge of the tab 44 engages the conductive rim 40 completing the circuit as previously explained and creating a signal. The rejection mechanism is then operated to remove the container.

Figure 5:
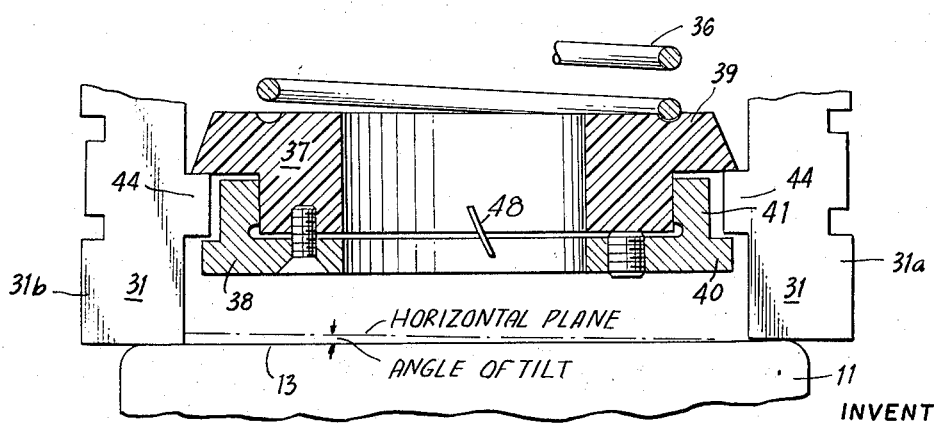
FIG. 5 is a fragmentary sectional view of the sensing apparatus taken along lines 4—4 of FIG. 3 illustrating the inspection of a tilted rim.

A particular feature of the detector 15 is the accommodation to a container or rim that is tilted. This is illustrated in FIG. 5. The detector inspects sealing edges that are tilted from the horizontal, as well as sealing edges in a horizontal plane. Due to the universal action of the reference member 35 the rim 39 rests on the tabs 44. If the tabs of successive elements are slightly lowered or raised due to the tilt, the reference plane formed by the upper surface of the tabs 44 is correspondingly tilted. As illustrated the rim 39 rests on the upper surface of diametrically opposite tabs, thus tilting the reference formed by the rim 39 to correspond with the tilt of the rim. Any intermediate sensing elements which register with a dip will drop from the rim 39 to indicate whether or not the container is to be accepted or rejected.

In the other embodiment shown in FIG. 9 the shaft 50 and the supporting member 51 are formed as a single solid piece of conductive metal. The sleeve 52 has a disc member 53 attaching the sleeve member 52 to the flange 54 of the supporting member 51 by the screws 55. An annular space 54a is provided between the support member 51 and the sleeve 52 to receive the circumferentially stacked elements 56 and hold the elements in position. The supporting member 51 has a raised portion 57 forming an upper shoulder 58. The sensing elements 56 have notches 60 fitting around the raised portion 57 and forming shoulder 61 for engaging shoulder 58. The elements are guided between the sleeve and supporting member.

The sensing elements 56 are similar to the sensing element illustrated in FIG. 6 and have a wedge shape to form radially extending sides 56a and 56b. The elements are circumferentially stacked to slide axially relative to one another. A tab 74 is provided similar to the tab 44.

The reference ring 63 has an opening 63a and is mounted exteriorly to the elements 56. The upper ring member 64 and a lower ring member 66 are separated by an insulating washer or ring 68 to electrically isolate the lower ring member from the upper ring member. The upper ring 64 is fastened to the washer 68 by the screws 69 and the lower conductive ring is fastened by screws (not shown). The reference ring 63 is connected to the sleeve 52 by the helical spring 71 to axially and universally move in relation to the supporting member 51 and sensing elements.

The rings 64 and 66 extend radially inward to form shoulders 72 and 73 for engagement by the tabs 74 on the elements 56. As in the previous embodiment, on the downward movement of the detector the elements 56 engage the upper edge 13 of the rim 11. The sealing edge 13 stops the downward movement of the engaging elements. The tabs 74 on these engaging elements contact the shoulder 72 of the ring 64 and stop the downward movement of the reference ring 63.

An annular elastic gasket 75 is positioned between the upper ends of the elements 56 and the flange 54 on the supporting member 51. The continued downward movement of the shaft 50 forces the other elements downward into engagement with the rim 11. If the distance of travel is greater than the distance E between the lower edges 74a and the shoulders 73, the tabs 74 engage the conductive ring 66 completing a circuit and creating a signal indicating that the container is defective.

It is thus seen from the foregoing description that a sensing apparatus has been provided which engages the entire rim of a glass container for the inspection of the entire sealing surface. The thin sensing elements incrementally engage the sealing surface and are variable in relation to one another to follow the contour of the sealing edge. The lower edge surfaces of the elements form an axially variable surface means sinuously adjusting to the sealing edge. If the variation is greater than acceptable, the sensing element completes an electrical circuit to indicate that the container is defective and should be rejected.

Thus the entire rim of a glass container is sensed at the same time with a differentiation between acceptable and unacceptable variations in the sealing edge. The sensing elements follow a long shadow dip and an individual sensing element can fit into a short sharp dip of greater width than the width of the surface 31c. The radial length the the surface permits a range of rim diameters to be tested by a given detector and also permits the containers to be slightly off center and still be properly examined if the entire sealing edge is engaged.

A particular feature of this embodiment is that the sealing edge may be tilted from the horizontal and the sealing edge will be properly inspected, since the tabs will follow the tilt and set a tilted reference plane. Any departures from the tilted reference plane by sensing elements entering dips will be detected in the same manner as a horizontal sealing edge.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A container rim inspection apparatus comprising a plurality of sensing elements, a support member for holding said sensing elements to extend radially in a circumferential array and an axially movable relation to one another on engagement with a container rim, a reference member having axially spaced first and second means for defining the limits of deviation of said sensing elements, means for urging said reference member to a position wherein said first means is in reference relation with those of said sensing elements contacting a container rim and wherein said second means can be contacted by other of said sensing elements for an unacceptable deviation in position of any of said other of said sensing elements to determine the acceptability of an inspected rim.

2. A container rim inspection apparatus comprising a plurality of thin sensing elements having narrow edges for incrementally engaging the sealing surface of a rim of a container, means for supporting said sensing elements in a circumferentially stacked and axially slideable relation and with said edges positioned for engaging a container rim, a reference member having axially spaced first and second surfaces with said first surface facing in the same direction as said edges and said second surface facing in the opposite direction of said edges, means for adjustably urging said reference member to a position wherein said first surface is in reference engagement with those of said sensing elements having their respective narrow edges contacting a container rim and wherein said second surface can be contacted by other of said sensing elements for an unacceptable deviation engagement by said other of said sensing elements to determine the acceptability of the inspected rim.

3. A container rim inspection apparatus as set forth in claim 2 wherein said reference member is axially and universally movable on said supporting means.

4. A container rim inspection apparatus as set forth in claim 2 wherein said sensing elements have radially extending means with an axial dimension for differentiating between acceptable and unacceptable deviations of a sealing edge of a rim.

5. A container rim inspection apparatus as set forth in claim 4 wherein said first and second surfaces are in facing relation and said axially extending means on said sensing elements are radially extending tabs with an axial length less than the axial spacing between the first and second surfaces providing a tolerance for differentiating between acceptable and unacceptable deviations of a sealing edge of a rim.

6. A container rim inspection apparatus as set forth in claim 2 wherein said supporting means has a circumferentially extending radial surface facing in opposite direction to said edges and said sensing elements have shoulders facing in the same direction as said edges for engaging said radial surface to retain said sensing elements within said supporting means.

7. A container rim inspection apparatus as set forth in claim 2 wherein resilient means is positioned between said supporting means and said sensing elements for forcing said sensing elements not initially contacting a rim to slide axially with respect to said sensing elements in contacting relation for determining the acceptability of deviations from the evenness of a rim.

8. A container rim inspection apparatus as set forth in claim 7 wherein said resilient means is an elastic gasket positioned between the upper end of said sensing elements and said supporting means.

9. A container rim inspection apparatus for engaging the rim of a container comprising an axially extending support means having coaxial walls defining a concentric axially extending chamber with one of said walls having a circumferentially extending radial shoulder facing in opposite direction to the container rim engaging end of the apparatus a reference member having an upper portion with a radially extending circumferential rim having a surface facing the container rim engaging end and a lower portion having a radially extending circumferential rim facing away from said rim engaging end, resilient mounting means attached to said support means and said reference member for supporting said reference member in an axially movable and universally tiltable relation, a large number of thin wedge-shaped axially extending sensing elements circumferentially stacked in said chamber and having flat radial sides in slideable contact for independent movement of said sensing elements for incrementally engaging the sealing edge of a container rim for sensing the contour thereof, said sensing elements having tabs with an axial length less than the spacing between said rim surfaces for incrementally engaging the upper rim surface of said reference member for setting a reference on said sensing elements engaging a container rim and for setting said lower rim surface for engagement by sensing elements incrementally sensing deviations in evenness of contour to determine the acceptability of an inspected rim.

10. A container rim inspection apparatus as set forth in claim 9 wherein said reference member is radially inside of said sensing elements with said rims extending radially outward and said tabs extending radially inward to interfit with said rims.

11. A container rim inspection apparatus as set forth in claim 9 wherein said reference member is radially exterior to said sensing elements with said rims extending radially inward and said tabs extending radially outward to interfit with said rims.

12. A container rim inspection apparatus as set forth in claim 9 wherein said lower portion and tabs are electrically conductive for completing an electrical circuit to indicate an unacceptable deviation.

13. A container rim inspection apparatus as set forth in claim 9 wherein said upper portion is electrically isolated and said lower portion and tabs are electrically conductive to indicate an acceptable container on non-engagement of said lower portion by any of said tabs and to indicate an unacceptable container on engagement by one or more of said tabs.

14. A container rim inspection apparatus as set forth in claim 9 wherein said resilient mounting means is a helical spring attached at one end to said support means and at the other end to said upper portion.

15. A container rim inspection apparatus as set forth in claim 9 wherein said resilient means is a helical spring attached to said supporting means and said reference member to force said reference member into contact with said tabs.

16. A container rim inspection apparatus as set forth in claim 1 wherein means are provided for tiltably supporting said reference member to conform to the plane of a container rim for positioning said first and second means in reference relation with a container rim.

References Cited
UNITED STATES PATENTS

| | | | |
|---|---|---|---|
| 2,553,129 | 5/1951 | Burnett | 33—174 |
| 2,690,620 | 10/1954 | Arelt | 33—174 |
| 3,080,659 | 3/1963 | Wolford | 33—174 |
| 3,106,780 | 10/1963 | Uhlig | 33—174 |

SAMUEL S. MATTHEWS, *Primary Examiner.*

LEONARD FORMAN, *Examiner.*